(12) United States Patent
Kwon et al.

(10) Patent No.: US 7,990,922 B2
(45) Date of Patent: Aug. 2, 2011

(54) METHOD AND APPARATUS FOR TRANSMITTING INFORMATION OF DEVICE IN WIRELESS PERSONAL AREA NETWORK

(75) Inventors: Chang-yeul Kwon, Yongin-si (KR); Jae-min Lee, Suwon-si (KR); Seong-soo Kim, Seoul (KR); Myung-ha Kuh, Suwon-si (KR); Guoping Fan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 19 days.

(21) Appl. No.: 12/267,055

(22) Filed: Nov. 7, 2008

(65) Prior Publication Data

US 2009/0129283 A1 May 21, 2009

Related U.S. Application Data

(60) Provisional application No. 60/986,728, filed on Nov. 9, 2007.

(30) Foreign Application Priority Data

Aug. 12, 2008 (KR) .................. 10-2008-0079029

(51) Int. Cl.
*H04J 3/24* (2006.01)
*H04W 4/00* (2009.01)
(52) U.S. Cl. ......... 370/329; 370/338; 370/341; 370/349
(58) Field of Classification Search .................. None
See application file for complete search history.

(56) References Cited

U.S. PATENT DOCUMENTS

| | | | |
|---|---|---|---|
| 2003/0053549 A1* | 3/2003 | Uesugi | ........................ 375/261 |
| 2005/0143011 A1* | 6/2005 | Jacobsen | ................... 455/67.13 |
| 2006/0217147 A1 | 9/2006 | Olvera-Hernandez et al. | |
| 2006/0242025 A1* | 10/2006 | Nishihara et al. | ............... 705/15 |
| 2007/0008922 A1 | 1/2007 | Abhishek et al. | |
| 2007/0060128 A1 | 3/2007 | Kil | |
| 2007/0104280 A1* | 5/2007 | Ibrahim et al. | ............... 375/260 |
| 2007/0133490 A1 | 6/2007 | Kwon | |

(Continued)

FOREIGN PATENT DOCUMENTS

KR    10-2006-0093020 A    8/2006

(Continued)

OTHER PUBLICATIONS

Office Action dated Apr. 29, 2010, issued in counterpart Korean Application No. 10-2008-0079029.

*Primary Examiner* — Chi H Pham
*Assistant Examiner* — Soon-Dong D Hyun
(74) *Attorney, Agent, or Firm* — Sughrue Mion, PLLC (57) ABSTRACT

Provided is a method of transmitting information regarding a device in a wireless personal area network (WPAN). In the method, a probe request frame is received from one of devices belonging to the WPAN according to a common mode which is a physical layer (PHY) transmission mode being commonly supported by the devices, the probe request frame containing information requesting information regarding a PHY transmission mode supported by another specific device, a probe response frame containing the information regarding the PHY transmission mode supported by the specific device is generated, and then the probe response frame is transmitted to the device transmitting the probe request frame, according to the common mode.

20 Claims, 6 Drawing Sheets

U.S. PATENT DOCUMENTS

| | | | |
|---|---|---|---|
| 2007/0237126 A1* | 10/2007 | Pirila et al. | 370/349 |
| 2008/0077691 A1* | 3/2008 | Park et al. | 709/226 |
| 2008/0182614 A1* | 7/2008 | Cormier et al. | 455/552.1 |
| 2008/0311914 A1* | 12/2008 | Tinnakornsrisuphap et al. | 455/436 |
| 2009/0135772 A1* | 5/2009 | Kwon et al. | 370/329 |
| 2009/0225689 A1* | 9/2009 | Yu | 370/310.2 |

FOREIGN PATENT DOCUMENTS

| | | |
|---|---|---|
| KR | 10-2007-0021727 A | 2/2007 |
| KR | 10-2007-0062893 A | 6/2007 |

* cited by examiner

METHOD AND APPARATUS FOR TRANSMITTING INFORMATION OF DEVICE IN WIRELESS PERSONAL AREA NETWORK

This application claims the benefit of U.S. Provisional Application No. 60/986,728, filed on Nov. 9, 2007 and Korean Patent Application No. 10-2008-0079209, filed on Aug. 12, 2008, in the Korean Intellectual Property Office, the disclosures of which are incorporated herein in their entirety by reference.

The present invention relates to a method and apparatus for transmitting information regarding a device in a wireless personal area network (WPAN) and other types of wireless networks.

The wireless personal area network (WPAN) is a wireless network via which devices within a short distance establish data communication with one another with low power consumption. A technique whereby a large capacity of data can be transmitted at a frequency band of 60 GHz in the WPAN, at high speed by using a millimeter wave having a short wavelength of 1-10 mm and strong directivity, has recently been developed. This technique can enable high definition or high quality multimedia (video/audio) contents to be transmitted without being compressed in the WPAN so as to overcome any problem associated with the transmission of compressed data (e.g., high cost, longer delay, codec support requirement and so forth) due to a certain limited bandwidth in the network.

Thus, various physical layer (PHY) transmission modes, such as a single carrier (SC), orthogonal frequency division multiplexing (OFDM), on-off-keying (OOK), can be used in the WPAN.

In this case, if devices having different PHY transmission modes coexist in one WPAN, they cannot communicate with one another. For example, a device supporting an SC-based PHY transmission mode (hereinafter referred to as 'SC device') cannot process data received from a device supporting an OFDM-based PHY transmission mode (hereinafter referred to as an 'OFDM device'), thereby preventing communication from being established between the SC device and the OFDM device.

According to an aspect of the present invention, there is provided a method of transmitting information regarding different PHY (physical layer) transmission modes being respectively supported by devices in a WPAN (wireless personal area network) to which the devices belong, the method including receiving a probe request frame transmitted from one of the devices in a common mode, where the probe request frame contains information requesting information regarding a PHY transmission mode supported by another specific device and the common mode is a PHY transmission mode being commonly supported by the devices; generating a probe response frame containing the information regarding the PHY transmission mode supported by the specific device; and transmitting the probe response frame to the device transmitting the probe request frame, according to the common mode.

The probe request frame may include information requesting capabilities supported by the specific device, and at least one of an index identifying information requesting the capabilities, information indicating that a command type of the probe request frame is a probe request command, and information indicating length of the probe request frame, wherein the information requesting the capabilities supported by the specific device comprises the information requesting the information regarding the PHY transmission mode supported by the specific device.

The probe response frame may include information regarding capabilities supported by the specific device, and at least one of information indicating that a command type of the probe response frame is a probe response command and information indicating length of the probe response frame, wherein the information regarding the capabilities supported by the specific device comprises information indicating at least one of PHY transmission modes employing a single carrier, on-off keying, or orthogonal frequency division multiplexing, which is supported by the specific device, and information indicating whether the specific device supports unequal error protection (UEP) coding.

The information regarding the PHY transmission mode may include information indicating at least one of PHY transmission modes respectively employing a single carrier, on-off keying, or orthogonal frequency division multiplexing.

The common mode may include one of PHY transmission modes employing a single carrier, wherein the PHY transmissions employing a single carrier comprise at least one of PHY transmission modes respectively employing binary phase-shift keying, minimum shift keying, Gaussian filtered minimum shift keying, and quadrature phase-shift keying.

According to another embodiment of the present invention, there is provided a method of transmitting information regarding different PHY (physical layer) transmission modes being respectively supported by devices in a WPAN (wireless personal area network) to which the devices belong, the method including receiving an association request frame which is transmitted from a device which does not join the WPAN according to a common mode in order to request join the WPAN, where the common mode is a PHY transmission mode being commonly supported by the devices; generating an association response frame in response to the association request frame, and transmitting the association response frame to the device which does not join the WPAN according to the common mode; generating a beacon frame or an announce command frame containing information regarding a PHY transmission mode supported by the device which does not join the WPAN; and transmitting the beacon frame or the announce command frame to all the devices belonging to the WPAN according to the common mode.

The beacon frame or the announce command frame further may include information indicating whether the device which does not join the WPAN supports unequal error protection (UEP) coding.

The generating of the beacon frame or the announce command frame further may include extracting the information regarding the PHY transmission mode supported by the device which does not join the WPAN from the association request frame received from the device which does not join the WPAN.

The announce command frame may further comprise at least one of information indicating that a command type of the announce command frame is an announce command and information indicating length of the announce command frame.

According to another aspect of the present invention, there is provided an apparatus for transmitting information regarding PHY (physical layer) transmission modes being respectively supported by devices in a WPAN (wireless personal area network) to which the devices belong, the apparatus including a receiving unit receiving a probe request frame transmitted from one of the devices in a common mode, where the probe request frame contains information requesting information regarding a PHY transmission mode supported by another specific device and the common mode is a PHY transmission mode being commonly supported by the devices; a frame generating unit generating a probe response frame containing information regarding the PHY transmission mode supported by the specific device; and a transmitting unit transmitting the probe response frame to the device transmitting the probe request frame, according to the common mode.

According to another aspect of the present invention, there is provided an apparatus for transmitting information regarding different PHY (physical layer) transmission modes being respectively supported by devices in a WPAN (wireless personal area network) to which the devices belong, the apparatus including a receiving unit receiving an association request frame transmitted from a device which does not join the WPAN according to a common mode in order to request join the WPAN, where the common mode is a PHY transmission mode being commonly supported by the devices; a frame generating unit generating an association response frame in response to the association request frame, and generating a beacon frame or an announce command frame containing information regarding a PHY transmission mode supported by the device which does not join the WPAN; and a transmitting unit transmitting the association response frame to the device which does not join the WPAN and transmitting the beacon frame or the announce command frame to all the devices belonging to the WPAN, according to the common mode.

The apparatus may further include an extracting unit extracting the information regarding the PHY transmission mode supported by the device which does not join the WPAN from the association request frame received from the device which does not join the WPAN.

According to another aspect of the present invention, there is provided a computer readable medium having recorded thereon a computer program for executing a method of transmitting information regarding different PHY (physical layer) transmission modes being respectively supported by devices in a WPAN (wireless personal area network) to which the devices belong, the method including receiving a probe request frame transmitted from one of the devices in a common mode, where the probe request frame contains information requesting information regarding a PHY transmission mode supported by another specific device and the common mode is a PHY transmission mode being commonly supported by the devices; generating a probe response frame containing the information regarding the PHY transmission mode supported by the specific device; and transmitting the probe response frame to the device transmitting the probe request frame, according to the common mode.

According to another aspect of the present invention, there is provided a computer readable medium having recorded thereon a computer program for executing a method of transmitting information regarding different PHY (physical layer) transmission modes being respectively supported by devices in a WPAN (wireless personal area network) to which the devices belong, the method including receiving an association request frame which is transmitted from a device which does not join the WPAN according to a common mode in order to request join the WPAN, where the common mode is a PHY transmission mode being commonly supported by the devices; generating an association response frame in response to the association request frame, and transmitting the association response frame to the device which does not join the WPAN according to the common mode; generating a beacon frame or an announce command frame containing information regarding a PHY transmission mode supported by the device which does not join the WPAN; and transmitting the beacon frame or the announce command frame to all the devices belonging to the WPAN according to the common mode.

According to another aspect of the present invention, there is provided a device for transmitting information regarding a plurality of PHY transmission modes being respectively supported by a plurality of devices in a WPAN to which the plurality of devices belong, the device comprising: a receiving unit receiving a probe request frame; a frame generating unit generating a probe response frame; and a transmitting unit; a bus coupling each unit of the device; at least one processor coupled to the bus; and at least one memory coupled to the bus to store instructions and to the at least one processor to execute and perform a method comprising: receiving, at the receiving unit, the probe request frame from the first device in a common mode, where the probe request frame contains information requesting information regarding a PHY transmission mode supported by a second device; generating, the frame generating unit, a probe response frame containing the information regarding the PHY transmission mode supported by the second device; and transmitting the probe response frame from the transmitting unit to the first device in the common mode, wherein the common mode is a PHY transmission mode being commonly supported by the devices.

Configuration and method of transmitting information regarding different PHY (physical layer) transmission modes being respectively supported by devices in a WPAN according to an exemplary embodiment of the present invention can be implemented in a variety of manners, including the other wireless or wired communications environment, without departing from the scope of the present invention.

The above and other features and advantages of the present invention will become more apparent by describing in detail exemplary embodiments thereof with reference to the attached drawings in which.

Exemplary embodiments of the present invention will now be described in detail with reference to the attached drawings.

Figure 1:
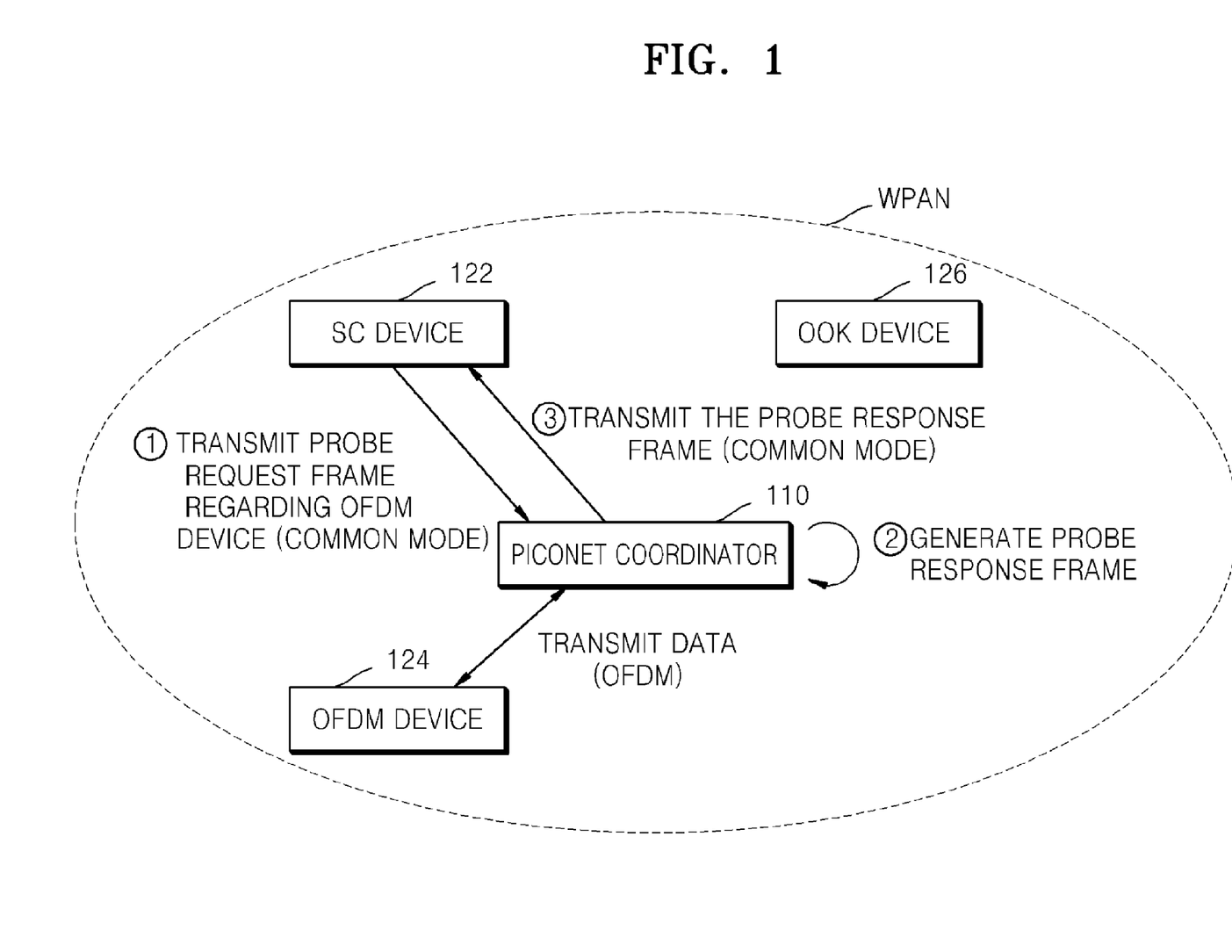
FIG. 1 is a diagram illustrating a method of transmitting information regarding a device according to an embodiment of the present invention.

FIG. 1 is a diagram illustrating a method of transmitting information regarding a device according to an exemplary embodiment of the present invention. Referring to FIG. 1, a wireless personal area network (WPAN) according to the exemplary embodiment includes a piconet coordinator 110, a device 122 supporting a single carrier (SC)-based PHY transmission mode (hereinafter referred to as an 'SC device'), a device 124 supporting an orthogonal frequency division multiplexing (OFDM)-based PHY transmission mode (hereinafter referred to as an 'OFDM device'), and a device 126 supporting an on-off-keying (OOK)-based PHY transmission mode (hereinafter referred to as an 'OOK device').

FIG. 1 may illustrate a process in which the SC device 122 receives information regarding the PHY transmission mode supported by the OFDM device 124 from the piconet coordinator 110.

Here, it can be assumed that the piconet coordinator 110 is a device supporting the OFDM-based PHY transmission mode. Thus, the piconet coordinator 110 can communicate with the OFDM device 124 by exchanging data in the OFDM transmission mode but cannot communicate with the SC device 122 and the OOK device 126.

In a first stage of the method, the SC device 122 transmits a probe request frame regarding an OFDM device to the piconet coordinator 110 according to a common mode in order to check the PHY transmission mode supported by the OFDM device 124.

Here, the common mode can be a PHY transmission mode being commonly supported by devices supporting different PHY transmission modes, and may be one of SC-based PHY transmission modes. For example, the SC-based PHY transmission modes may include four PHY transmission modes employing binary phase-shift keying (BPSK), minimum shift keying (MSK), Gaussian filtered minimum shift Keying (GMSK), or quadrature phase shift keying (QPSK). The common mode may be one of the four PHY transmission modes.

In another embodiment of the present invention, only devices that can act as a piconet coordinator may support the common mode. Configuration and method of transmitting information regarding a device according to an exemplary embodiment of the present invention can be implemented in a variety of manners without departing from the scope of the present invention.

The probe request frame contains information requesting information regarding capabilities supported by the OFDM device 124. The capabilities supported by the OFDM device 124 include information regarding the PHY transmission mode supported by the OFDM device 124.

Figure 2:
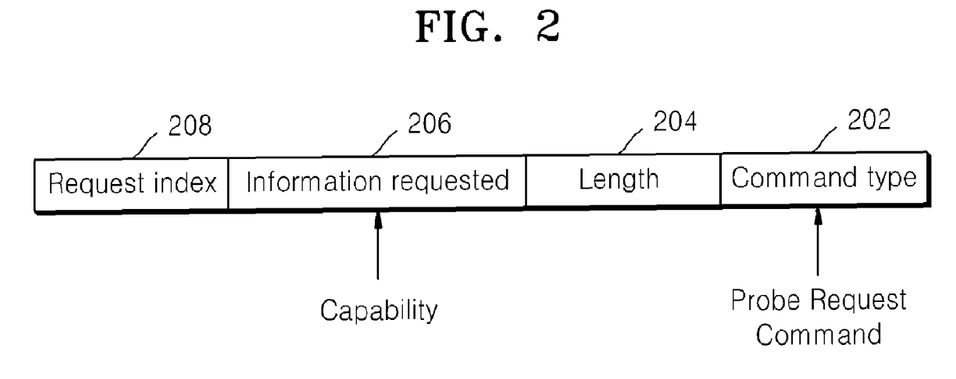
FIG. 2 is a diagram illustrating a probe request frame according to an embodiment of the present invention.

FIG. 2 is a diagram illustrating a probe request frame according to an embodiment of the present invention. Referring to FIG. 2, the probe request frame includes a command type field 202, a length field 204, a request information field 206, and a request index field 208.

The command type field 202 records information indicating that the command type of the frame is a probe request command. The probe request command is given to request information regarding capabilities supported by another specific device.

The length field 204 can record information indicating the length of the probe request frame.

The request information field 206 may record information requesting capabilities supported by another specific device.

For example, the request information field 206 may record information inquiring whether a predetermined device supports any one of the PHY transmission modes or information inquiring whether the predetermined device supports unequal error protection (UEP) coding.

The request index field 208 can record an index identifying whether information regarding capabilities of another specific device is requested via the request information field 206. Configuration of the probe request frame according to an exemplary embodiment of the present invention can be implemented in a variety of manners without departing from the scope of the present invention.

In a second stage of the method of FIG. 1, the piconet coordinator 110 can generate a probe response frame corresponding to the received probe request frame.

In this case, the probe response frame may contain information regarding capabilities supported by another specific device. Such information may be received directly from the device.

For example, the piconet coordinator 110 may receive an association request frame for joining the WPAN from a new device and the association request frame may contain information regarding capabilities supported by the new device.

In a third stage of the method, the piconet coordinator 110 can transmit the probe response frame to the SC device 122 that transmitted the probe request frame, according to the common mode.

Then the SC device 122 can recognize that the OFDM device 124 supports the OFDM-based PHY transmission mode based on the information regarding the capabilities of the OFDM device 124.

The SC device 122 can similarly obtain the information regarding the PHY transmission mode supported by the OOK device 126 or the capabilities of the OOK device 126, as described above.

As described above, according to the current embodiment, each of the devices 122, 124 and 126 in the WPAN can obtain information regarding the capabilities of another specific device to selectively communicate with a device employing the same PHY transmission mode.

Figure 3:
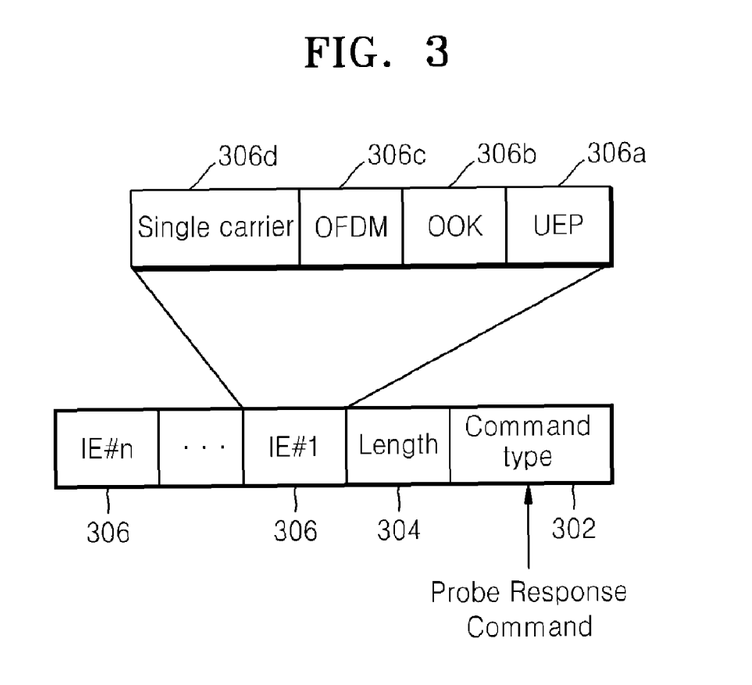
FIG. 3 is a diagram illustrating a probe response frame according to an embodiment of the present invention.

FIG. 3 is a diagram illustrating a probe response frame according to an embodiment of the present invention. Referring to FIG. 3, the probe response frame comprises a command type field 302, a length field 304 and a capabilities information field 306.

The command type field 302 can contain information indicating that the command type of the frame is a probe response command. The probe response command is a response to the probe request command and indicates information regarding capabilities supported by another specific device.

The length field 304 can include information regarding the length of the probe response frame.

The capabilities information field 306 can record capabilities supported by a device. The capabilities information field 306 may include a field 306a indicating whether the device supports UEP coding, and fields 306b, 306c and 306d, respectively, indicate PHY transmission modes each employing SC, OFDM, or OOK, which are supported by the device.

The device may support either only one of the PHY transmission modes respectively employing SC, OFDM, and OOK, or two or more modes from among the PHY transmission modes. In accordance with the exemplary embodiment of the present invention, the capabilities information field 306 may record at least one of the PHY transmission modes each employing SC, OFDM, or OOK, which are supported by the device.

Meanwhile, the term, 'capabilities information field' can be interchangeable with the term, 'information element(ie) field' in the drawings.

Figure 4:
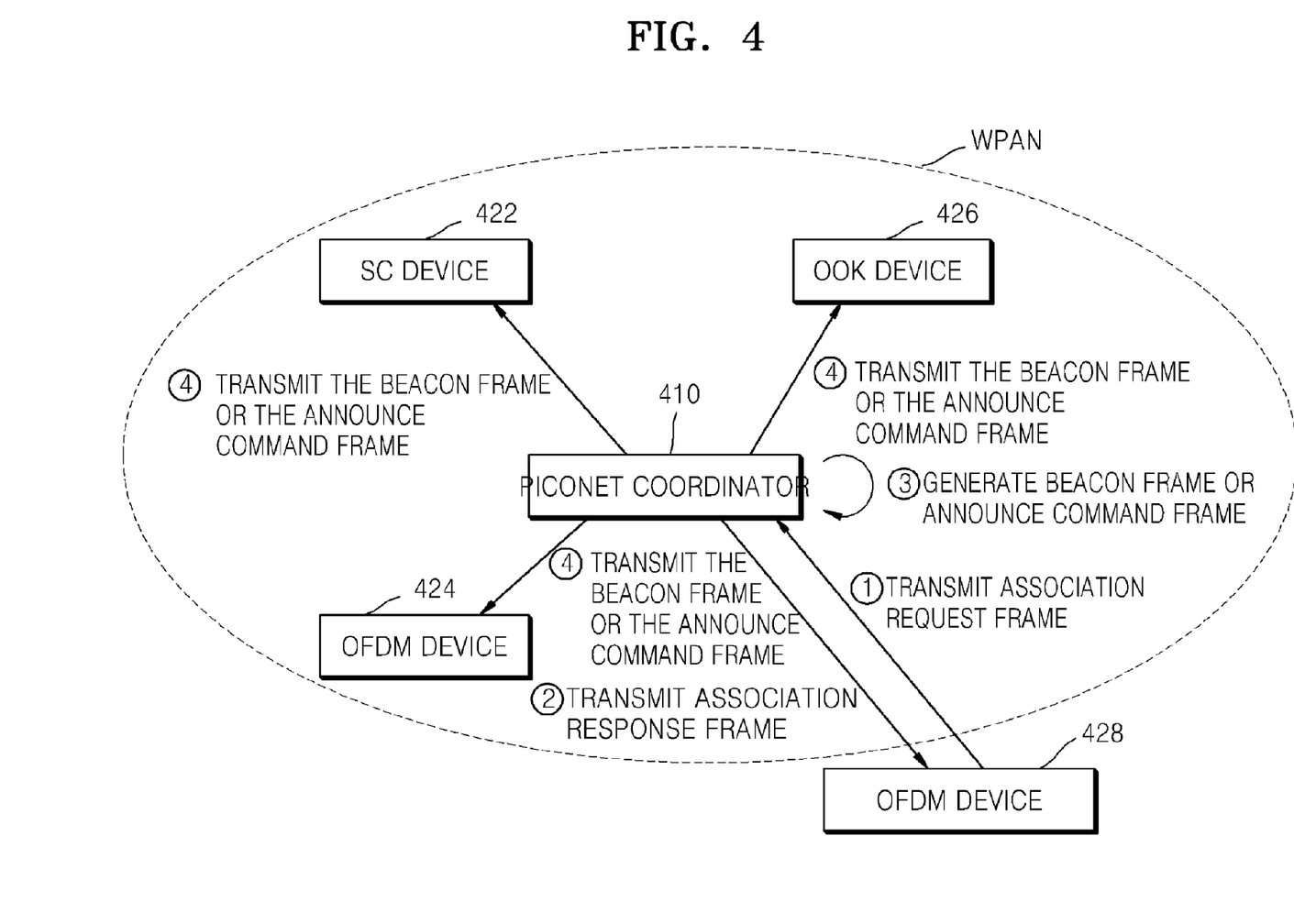
FIG. 4 is a diagram illustrating a method of transmitting information regarding a device according to another embodiment of the present invention.

FIG. 4 is a diagram illustrating a method of transmitting information regarding a device according to another embodiment of the present invention. Referring to FIG. 4, when a new OFDM device 428 joins a WPAN that includes a piconet coordinator 410, an SC device 422, an OFDM device 424 and an OOK device 426, the piconet coordinator 410 transmits information regarding the new OFDM device 428 to the devices belonging to the WPAN.

In a first stage of the method, the new OFDM device 428 transmits an association request frame to the piconet coordinator 410 according to a common mode in order to join the WPAN. The association request frame may contain information regarding capabilities supported by the new OFDM device 428.

In a second stage of the method, the piconet coordinator 410 can generate an association response frame for allowing the new OFDM device 428 to join the WPAN and can transmit the association response frame to the OFDM device 428 according to the common mode.

In a third stage of the method, the piconet coordinator 410 can generate a beacon frame or an announce command frame containing the information regarding the capabilities supported by the new OFDM device 428.

Here, the announce command frame can be used to inform the devices belonging to the WPAN of capabilities supported by a device.

The beacon frame may contain only information regarding PHY transmission modes.

The structures of the beacon frame and the announce command frame in accordance with an exemplary embodiment of the present invention can be further described with reference to FIGS. 5 and 6.

In a fourth stage of the method, the piconet coordinator 410 transmits the beacon frame or the announce command frame to all the devices 422, 424, and 426 belonging to the WPAN according to the common mode.

According to another embodiment of the present invention, all the other control frames as well as the beacon frame and the announce command frame may be transmitted according to the common mode. Configuration and method of transmitting information regarding a device according to an exemplary embodiment of the present invention can be implemented in a variety of manners without departing from the scope of the present invention.

Figure 5:
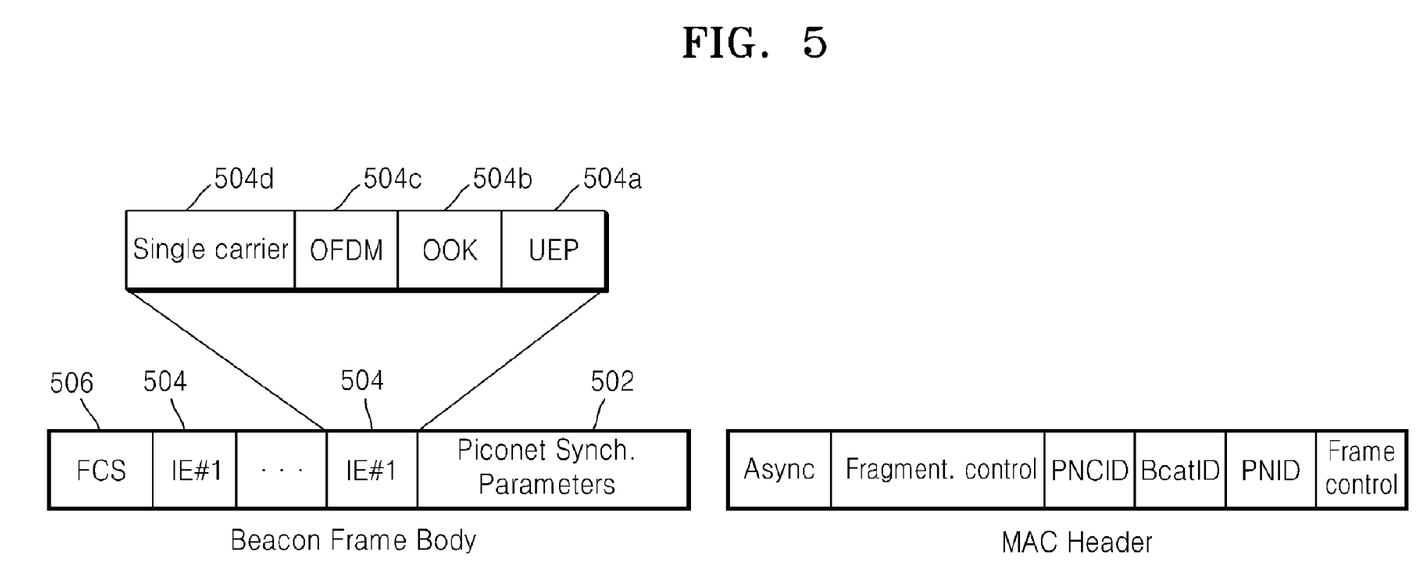
FIG. 5 is a block diagram illustrating a beacon frame according to an embodiment of the present invention.

FIG. 5 is a diagram illustrating a beacon frame according to an embodiment of the present invention. Referring to FIG. 5, the beacon frame includes a piconet sync parameter field 502, a capabilities information field ("IE") 504, and a frame check sequence (FCS) field 506.

The piconet sync parameter field 502 may include parameters for synchronizing a piconet coordinator with a device receiving the beacon frame in the WPAN.

The capabilities information field 504 can contain capabilities supported by another specific device. The capabilities information field 504 may include a field 504*a* indicating whether the specific device supports UEP coding, and fields 504*b*, 504*c*, and 504*d*, respectively, indicating PHY transmission modes each employing SC, OFDM, or OOK, which are supported by the specific device. For example, the capabilities information field 504 may record information regarding capabilities supported a device that newly joins a WPAN.

The FCS field 506 may allow an error to be detected from the piconet sync parameter field 502 and the capabilities information field 504.

When a new device joins the WPAN, such a beacon frame may be transmitted to devices belonging to the WPAN, but may be transmitted periodically or whenever a predetermined event occurs.

As illustrated in FIG. 5, the beacon frame may further include a medium access control (MAC) header, the fields of which are well explained in the IEEE 802.15.3C standards document.

Figure 6:
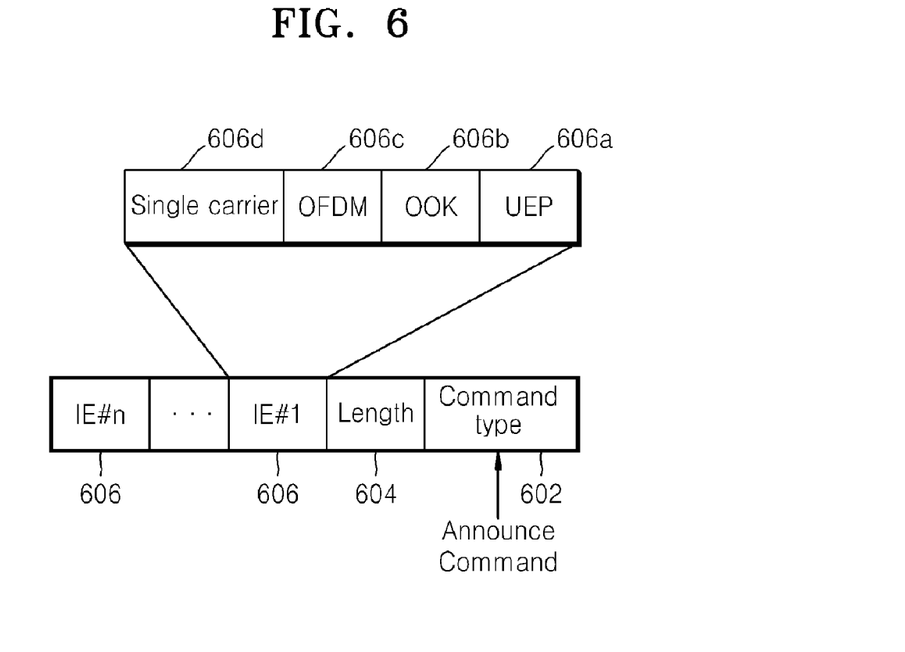
FIG. 6 is a block diagram illustrating an announce command frame according to an embodiment of the present invention.

FIG. 6 is a diagram illustrating an announce command frame according to an embodiment of the present invention.

Referring to FIG. 6, the announce command frame includes a command type field 602, a length field 604, and a capabilities information field 606.

The command type field 602 can include information indicating that the command type of the frame is an announce command.

The length field 604 may record information indicating the length of the announce command frame.

The capabilities information field 606 can include capabilities supported by a predetermined device. The capabilities information field 606 may include a field 606*a* indicating whether the device supports UEP coding, and fields 606*b*, 606*c*, and 606*d*, respectively, indicating PHY transmission modes each employing SC, OFDM, or OOK, which are supported by the device. For example, the capabilities information field 606 may record information regarding capabilities supported by a device newly joining the WPAN.

Such an announce command frame may be transmitted to devices belonging to the WPAN when a new device joins the WPAN, but may be transmitted periodically or whenever a predetermined event occurs.

Figure 7:
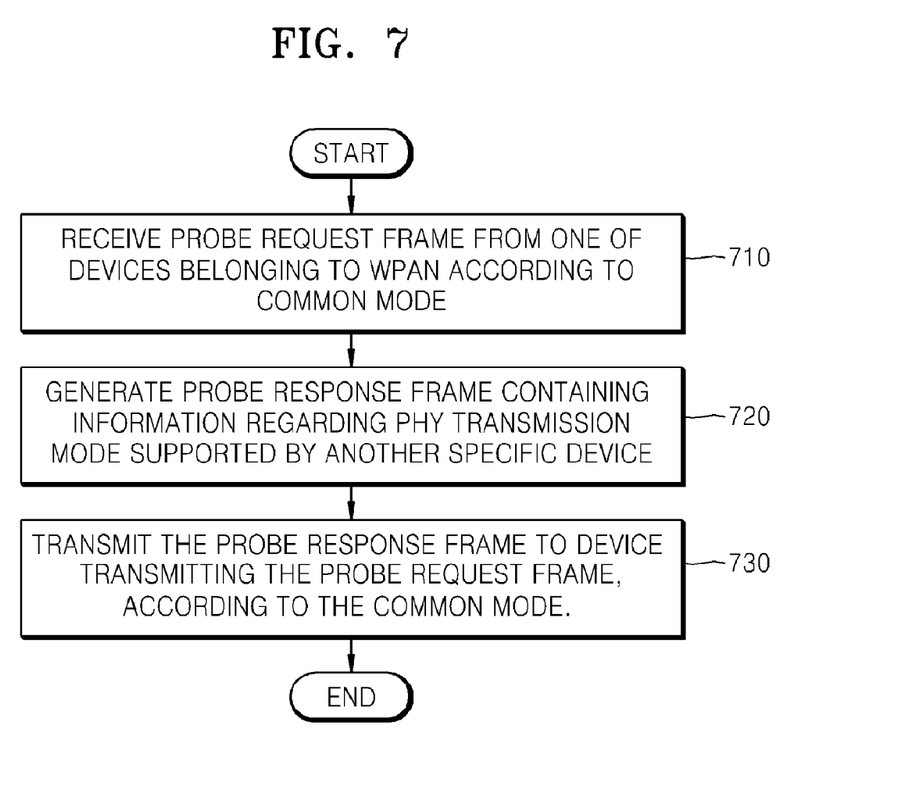
FIG. 7 is a flowchart illustrating a method of transmitting information regarding a device according to an embodiment of the present invention.

FIG. 7 is a flowchart illustrating a method of transmitting information regarding a device according to an embodiment of the present invention.

In operation 710, a probe request frame is received. The probe request frame is transmitted from one of WPAN devices in a common mode, and contains information requesting information regarding a PHY transmission mode supported by another specific device.

The probe request frame may further contain information requesting capabilities supported by another specific device. For example, the probe request frame may further contain information inquiring whether the specific device supports UEP coding.

In operation 720, a probe response frame containing information regarding a PHY transmission mode supported by the specific device is generated.

If the probe request frame contains not only the information requesting the information regarding the PHY transmission mode but also the information requesting the capabilities supported by the specific device, the probe response frame can contain the information regarding the capabilities supported by the specific device.

In operation 730, the probe response frame is transmitted to the device that transmitted the probe request frame, in the common mode.

Figure 8:
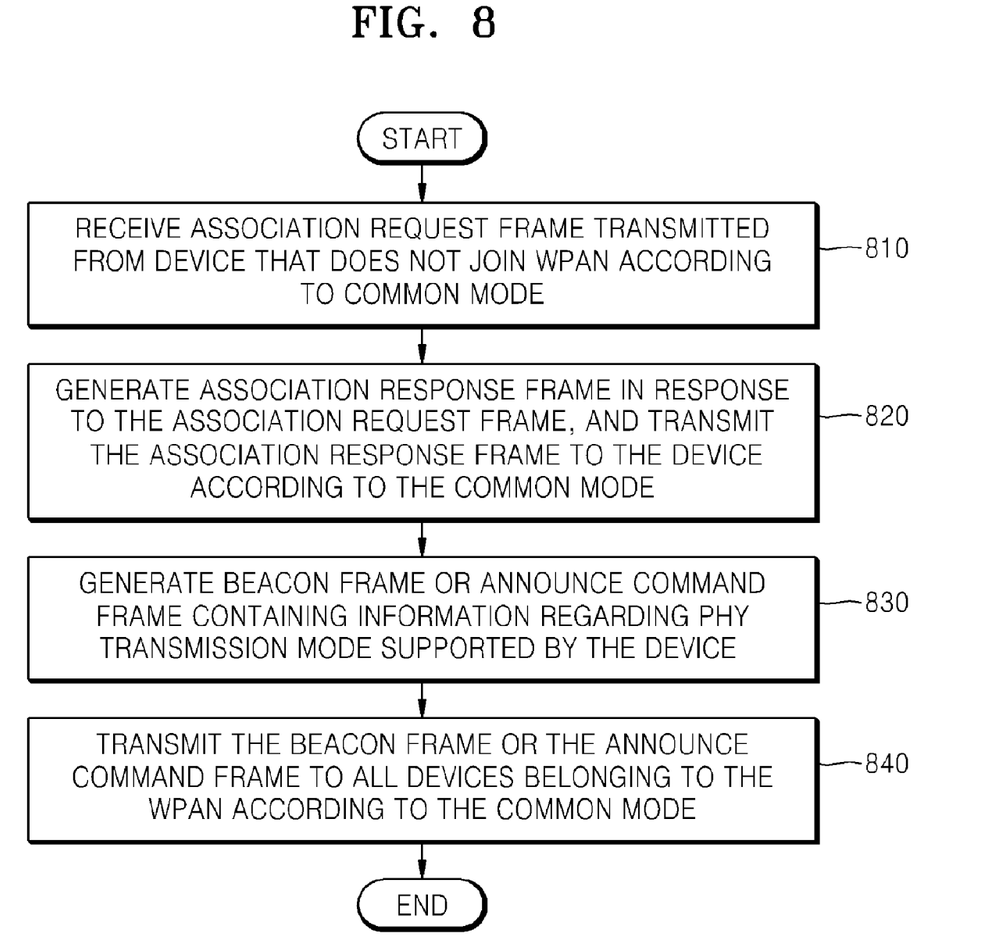
FIG. 8 is a flowchart illustrating a method of transmitting information regarding a device according to another embodiment of the present invention.

FIG. 8 is a flowchart illustrating a method of transmitting information regarding a device according to another embodiment of the present invention.

In operation 810, an association request frame is received. In order to join the WPAN, the association request frame can be transmitted from a device that does not join a WPAN, according to a common mode.

In operation 820, an association response frame is generated in response to the association request frame, and transmitted to the device transmitting the association request frame, according to the common mode.

Then the device receives the association response frame and can join the WPAN.

In operation 830, a beacon frame or an announce command frame containing information regarding a PHY transmission mode supported by the device is generated.

As described above, if the association request frame received in operation 810 includes the information regarding the PHY transmission mode, the beacon frame of the announce command frame may be obtained by extracting the information regarding the PHY transmission mode from the association request frame.

In operation 840, the beacon frame or the announce command frame is transmitted to all devices belonging to the WPAN according to the common mode.

Figure 9:
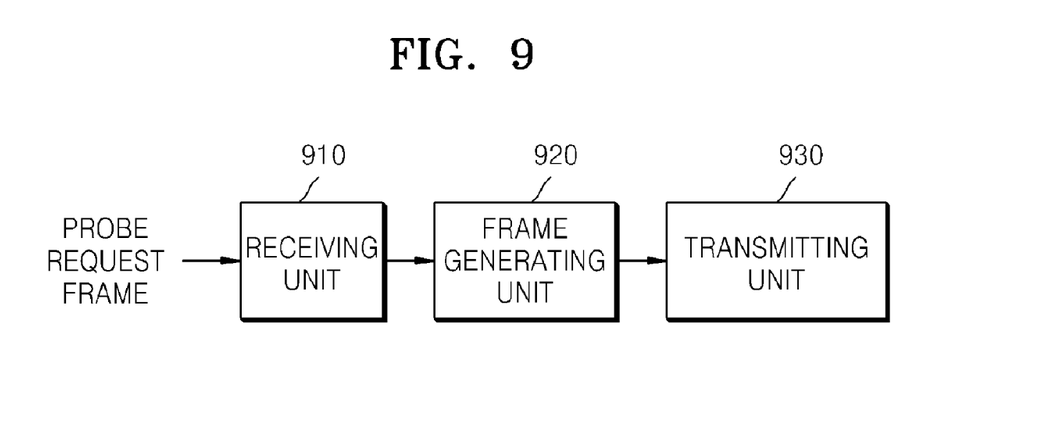
FIG. 9 is a block diagram of an apparatus for transmitting information regarding a device according to another embodiment of the present invention.

FIG. 9 is a block diagram of an apparatus for transmitting information regarding a device according to an embodiment of the present invention. Referring to FIG. 9, the apparatus includes a receiving unit 910, a frame generating unit 920, and a transmitting unit 930.

The receiving unit 910 receives a probe request frame from one of WPAN devices. The probe request frame is transmitted from one of the WPAN devices in a common mode, and contains information requesting information regarding a PHY transmission mode supported by another specific device. As described above, the probe request frame may further include information requesting capabilities supported by the specific device.

The receiving unit 910 also may receive an association request frame requesting joining to the WPAN from a predetermined device.

The frame generating unit 920 generates a probe response frame containing the information regarding the PHY transmission mode supported by the specific device or information regarding the capabilities of the specific device. The frame generating unit 920 may also generate a beacon frame or an announce command frame containing the information the PHY transmission mode or the capabilities of the specific device.

According to another embodiment of the present invention, the information regarding the PHY transmission mode or the capabilities of the specific device may be extracted from an association request frame transmitted to the receiving unit 910 from a device that desires to join the WPAN. The apparatus according to the current embodiment may further include an extraction unit (not shown) that extracts the information regarding the PHY transmission mode or the capabilities of the specific device from the association request frame.

The transmitting unit 930 transmits the probe response frame generated by the frame generating unit 920 to the device that transmitted the probe request frame according to the common mode. Also, the transmitting unit 930 may transmit the beacon frame or the announce command frame generated by the frame generating unit 920.

Configuration and method of transmitting information with respect to a device in a wireless network according to an exemplary embodiment of the present invention can be implemented in a variety of manners and comprise other units without departing from the scope of the present invention. For example, an apparatus for transmitting information regarding a device according to an exemplary embodiment of the present invention can comprise a bus coupling each unit of the apparatus as shown in FIG. 9, at least one processor coupled to the bus, a memory coupled to the bus to store instructions and to the at least one processor to execute instructions of generating the data frame as described earlier.

The present invention can be compatible with technologies such as 802.11x and 802.15.3.

The above embodiments can be embodied as a computer program. The computer program may be stored in a computer readable medium, and executed using a computer. Examples of the computer readable medium include a magnetic recording medium (a CD, a floppy disk, a hard disc, etc.), or an optical recording medium (a CD-ROM, a DVD, etc.) Carrier waves (e.g., transmission through the Internet) containing at least one of the embodiments of the present invention may be temporarily or permanently stored in the computer readable recording medium. Configuration or implementation of computer based instructions according to an embodiment of the present invention can be implemented in a variety of manners without departing from the scope of the present invention.

While the present invention has been particularly shown and described with reference to exemplary embodiments thereof using specific terms, the embodiments and terms have been used to explain the present invention and should not be construed as limiting the scope of the present invention defined by the claims. The preferred embodiments should be considered in a descriptive sense only and not for purposes of limitation. WPAN in accordance with an exemplary aspect of the present invention may be applicable to various applications as a wire or cable replacement technology for home entertainment systems capable of transmitting and receiving high definition video and audio, it will be understood by those skilled in the art that various changes in form and details may be made therein without departing from the spirit and scope of the invention as defined by the appended claims. The invention can be applied in alternative networks including 802.11, wireless fidelity ("WIFI") network, Ultrawide band ("UWB"), Piconet, ZigBee, and/or any other wireless communication network topology or protocol. The wireless communication devices such as the apparatus in FIG. 9 can be any of a variety of wireless communication devices including but not limited to a computer, mobile computer, cell phone, personal digital assistant ("PDA"), game console, TV or set-top box with wireless capability, DVD or Blueray ("BD") compatible media player, radio frequency identification device ("RFID"), or any other stationary or mobile apparatus.

The above exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of transmitting information regarding a plurality of Physical Layer (PHY) transmission modes being respectively supported by devices in a Wireless Personal Area Network (WPAN), which further comprises a coordinator, to which the devices belong, the method comprising:
   receiving at the coordinator a probe request frame from a first device in a common mode, where the probe request frame contains information requesting information regarding a PHY transmission mode supported by a second device;
   generating, at the coordinator, a probe response frame containing the information regarding the PHY transmission mode supported by the second device; and
   transmitting the probe response frame from the coordinator to the first device in the common mode,
   wherein the common mode is a PHY transmission mode being commonly supported by the devices.

2. The method of claim 1, wherein the probe request frame comprises information requesting capabilities supported by the second device, and at least one of an index identifying information requesting the capabilities, information indicating that a command type of the probe request frame is a probe request command, and information indicating length of the probe request frame,
   wherein the information requesting the capabilities supported by the second device comprises the information requesting the information regarding the PHY transmission mode supported by the second device.

3. The method of claim 1, wherein the probe response frame comprises information regarding capabilities supported by the second device, and at least one of information indicating that a command type of the probe response frame is a probe response command and information indicating length of the probe response frame, wherein the information regarding the capabilities supported by the second device comprises information indicating at least one of PHY transmission modes employing a single carrier, on-off keying, or orthogonal frequency division multiplexing, which is supported by the second device, and information indicating whether the second device supports unequal error protection (UEP) coding.

4. The method of claim 1, wherein the information regarding the PHY transmission mode comprises information indicating at least one of PHY transmission modes respectively employing a single carrier, on-off keying, or orthogonal frequency division multiplexing.

5. The method of claim 1, wherein the common mode comprises one of PHY transmission modes employing a single carrier, wherein the PHY transmissions employing a single carrier comprise at least one of PHY transmission modes respectively employing binary phase-shift keying, minimum shift keying, Gaussian filtered minimum shift keying, and quadrature phase-shift keying.

6. A method of transmitting information regarding a plurality of Physical Layer (PHY) transmission modes being respectively supported by devices in a Wireless Personal Area Network (WPAN), the method comprising:

receiving an association request frame to join the WPAN from a first device which does not join the WPAN according to a common mode;

generating an association response frame in response to the association request frame, and transmitting the association response frame to the first device in the common mode;

generating a beacon frame or an announce command frame containing information regarding a PHY transmission mode supported by the first device; and transmitting the beacon frame or the announce command frame to all the devices belonging to the WPAN according to the common mode, wherein the common mode is a PHY transmission mode being commonly supported by the devices.

7. The method of claim 6, wherein the beacon frame or the announce command frame further comprises information indicating whether the first device supports unequal error protection (UEP) coding.

8. The method of claim 6, wherein the generating of the beacon frame or the announce command frame comprises extracting the information regarding the PHY transmission mode supported by the first device from the association request frame received from the first device.

9. The method of claim 6, wherein the announce command frame further comprises at least one of:

first information indicating that a command type of the announce command frame is an announce command, and second information indicating length of the announce command frame.

10. An apparatus for transmitting information regarding PHY transmission modes in a WPAN, to which a plurality of wireless devices belong, the apparatus comprising:

a receiver which receives a probe request frame from a first wireless device in a common mode, where the probe request frame contains information requesting information regarding a PHY transmission mode supported by a second wireless device and the common mode is a PHY transmission mode being commonly supported by the plurality of devices;

a frame generating unit generating a probe response frame containing information regarding the PHY transmission mode supported by the second device; and a transmitter which transmits the probe response frame to the first device in the common mode.

11. The apparatus of claim 10, wherein the probe request frame comprises information requesting capabilities supported by the second device, and at least one of an index identifying information requesting the capabilities, information indicating that a command type of the probe request frame is a probe request command, and information indicating length of the probe request frame, wherein the information requesting the capabilities supported by the second device comprises the information requesting the information regarding the PHY transmission mode supported by the second device.

12. The apparatus of claim 10, wherein the probe response frame comprises the information regarding the capabilities supported by the second device, and at least one of information indicating that a command type of the probe response frame is a probe response command and information indicating length of the probe response frame, wherein the information regarding the capabilities supported by the second device comprises at least one of information indicating at least one of PHY transmission modes respectively employing a single carrier, on-off keying, and orthogonal frequency division multiplexing, which is supported by the specific device, and information indicating whether the specific device supports unequal error protection coding.

13. The apparatus of claim 10, wherein the information regarding the PHY transmission mode comprises information indicating at least one of PHY transmission modes respectively employing a single carrier, on-off keying, and orthogonal frequency division multiplexing.

14. The apparatus of claim 10, wherein the common mode comprises one of PHY transmission modes employing a single carrier, wherein the PHY transmissions employing a single carrier comprise at least one of PHY transmission modes respectively employing binary phase-shift keying, minimum shift keying, Gaussian filtered minimum shift keying, and quadrature phase-shift keying.

15. An apparatus for transmitting information regarding a plurality of PHY transmission modes being respectively supported by a plurality of devices in a WPAN to which the plurality of devices belong, the apparatus comprising:

a receiver which receives an association request frame to join the WPAN from a first device which does not join the WPAN in a common mode, where the common mode is a PHY transmission mode being commonly supported by the plurality of devices;

a frame generating unit generating an association response frame in response to the association request frame, and generating a beacon frame or an announce command frame containing information regarding a PHY transmission mode supported by the first device; and a transmitter which transmits the association response frame to the first device and transmits the beacon frame or the announce command frame to the plurality of devices, in the common mode.

16. The apparatus of claim 15, wherein the beacon frame or the announce command frame further comprises information indicating whether the first device supports unequal error protection (UEP) coding.

17. The apparatus of claim 15, further comprising an extracting unit extracting the information regarding the PHY transmission mode supported by the first device from the association request frame.

18. The apparatus of claim 15, wherein the announce command frame further comprises at least one of:
first information indicating that a command type of the announce command frame is an announce command and second information indicating length of the announce command frame.

19. A non-transitory computer readable medium having recorded thereon a computer program for executing the method of claim 1.

20. A device for transmitting information regarding a plurality of PHY transmission modes being respectively supported by a plurality of devices in a WPAN to which the plurality of devices belong, the device comprising:

a receiving unit which receives a probe request frame from a first device in a common mode, where the probe request frame contains information requesting information regarding a PHY transmission mode supported by a second device;
a frame generating unit which generates a probe response frame containing the information regarding the PHY transmission mode supported by the second device;
a transmitting unit which transmits the probe response frame to the first device in the common mode;
a bus which couples the receiving unit, the frame generating unit, and the transmitting unit;
at least one processor which is coupled to the bus; and
at least one memory which is coupled to the bus and to the at least one processor, and stores instructions executed by the at least one processor to control the receiving unit, the frame generating unit, and the transmitting unit,
wherein the common mode is a PHY transmission mode being commonly supported by the devices.

* * * * *